Aug. 22, 1944.   A. F. CHOUINARD ET AL   2,356,215
TORCH CUTTING MACHINE
Filed April 19, 1941   2 Sheets-Sheet 2
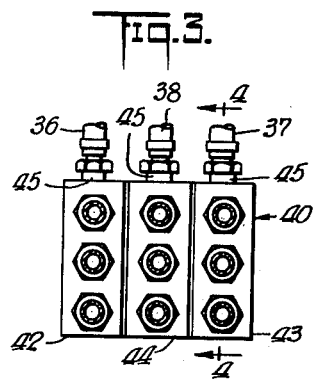
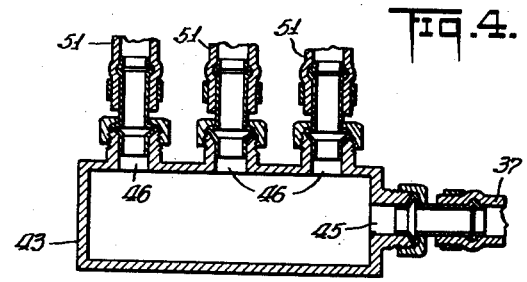
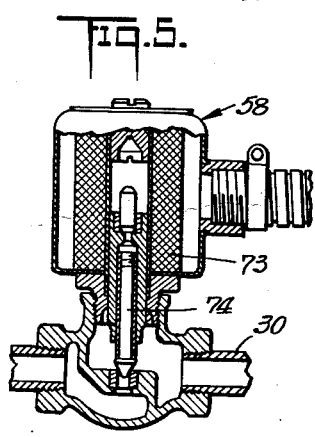
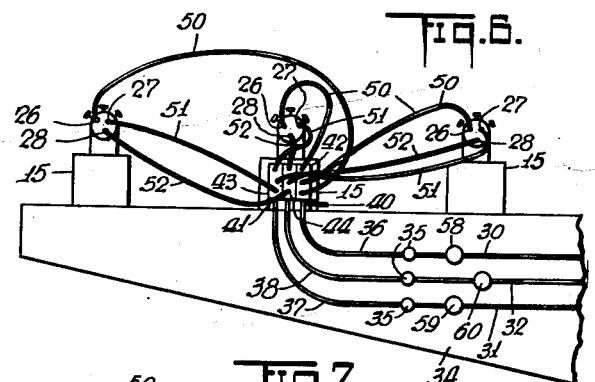
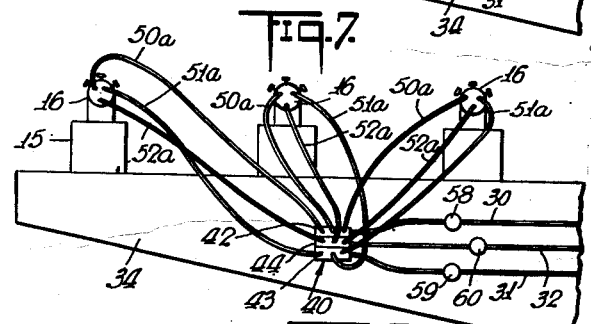
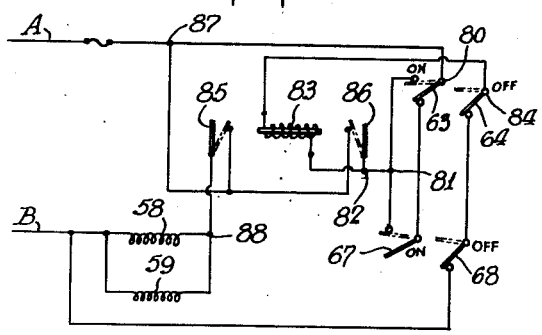
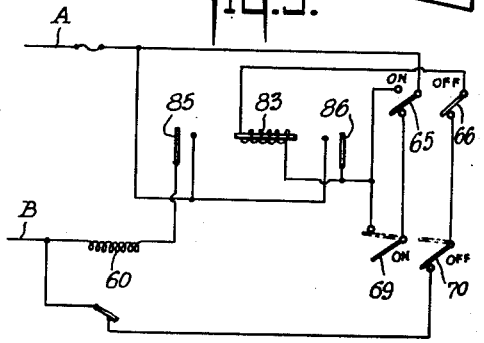
INVENTOR
Alfred F. Chouinard
BY Louis A. Bordeaux
ATTORNEYS Patented Aug. 22, 1944

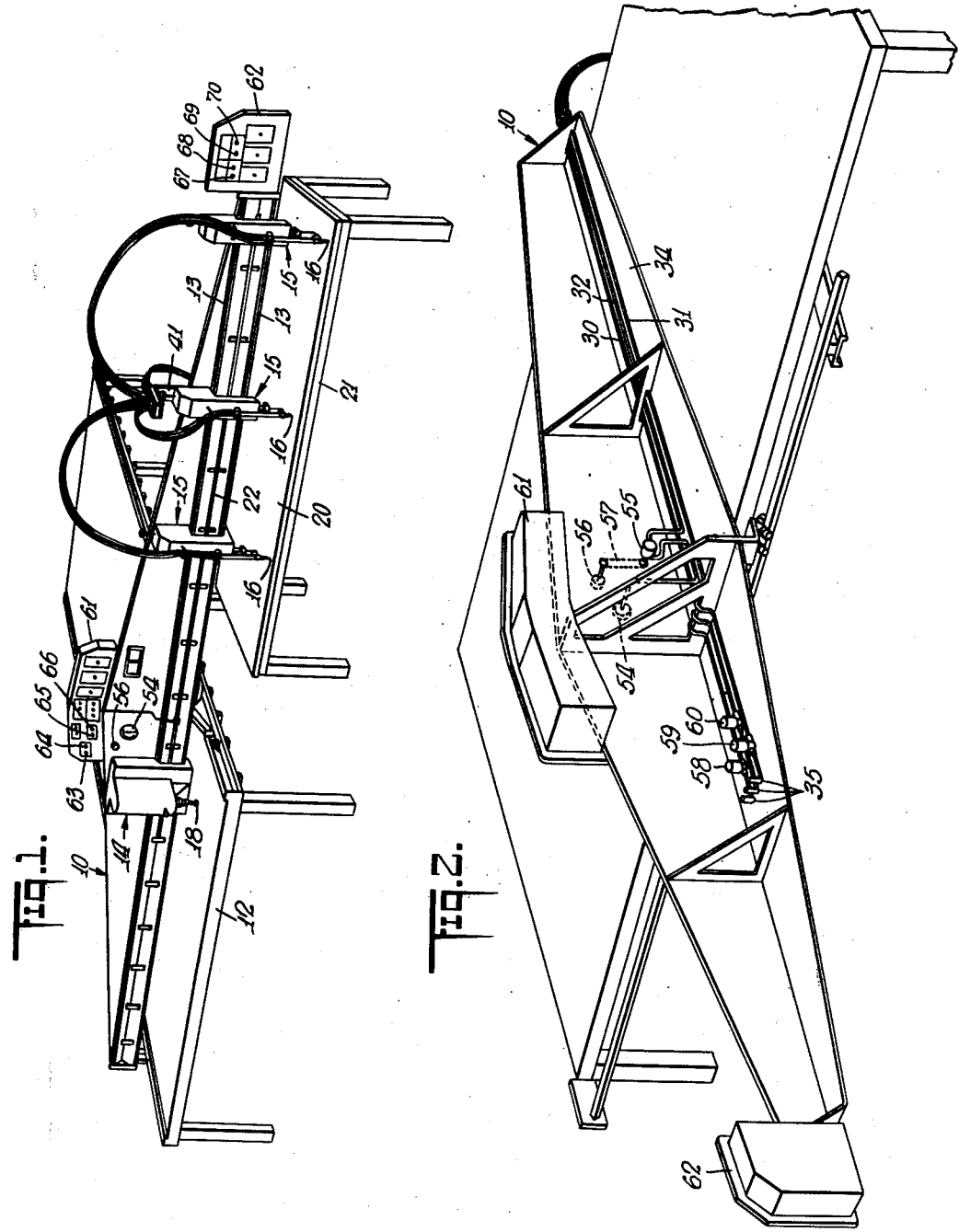

2,356,215

UNITED STATES PATENT OFFICE 2,356,215

TORCH CUTTING MACHINE

Alfred F. Chouinard, Chicago, and Louis A. Bordeaux, Lincolnwood, Ill., assignors to National Cylinder Gas Company, Chicago, Ill., a corporation of Delaware Application April 19, 1941, Serial No. 389,404

17 Claims. (Cl. 266—23)

The present invention relates to that general type of torch cutting machine, in which the torch is supported on a carriage, and is movable therealong and therewith, whereby the cut made by the torch may be controlled from a drawing, templet, pattern or the like.

One object of the present invention is to provide a new and improved means for controlling the high pressure cutting oxygen and pre-heat gases to the torch or torches of the cutting machine.

Another object is to provide means whereby the high pressure cutting oxygen and pre-heat gases to the torch or torches of a cutting machine can be remotely controlled from one or more stations.

Another object is to provide a manifold system, by which any selected number of torches of a cutting machine can be quickly connected to or disconnected from the gas supply.

Another object is to provide a manifold system on a cutting torch carriage, whereby any one or more of the torches mounted on the carriage may be removed or replaced together with its flexible hose, independently of the other torches on the carriage.

Various other objects of the invention will be apparent from the following particular description and from an inspection of the accompanying drawings, in which Fig. 1 is a perspective view of a torch cutting machine, showing one form of manifold system embodying the present invention.

Fig. 2 is a somewhat schematic perspective view of the rear side of the torch cutting machine shown in Fig. 1.

Fig. 3 is a top plan view of a manifold unit embodying the present invention.

Fig. 4 is a section taken on line 4—4 of Fig. 3.

Fig. 5 is a section through a suitable form of valve for controlling the gases to the torches.

Fig. 6 is a diagrammatic top plan view of a portion of the cutting machine of Fig. 1, showing the manifold system of Figs. 1 and 2.

Fig. 7 is a diagrammatic top plan view of a portion of the cutting machine, but showing another form of manifold system embodying the present invention.

Fig. 8 is a somewhat diagrammatic showing of a wiring diagram for controlling the pre-heat gases to the torches, and Fig. 9 is a somewhat diagrammatic showing of a wiring diagram for controlling the high pressure cutting oxygen to the torches.

As an example of the type of torch cutting machine in which our invention may be employed, I have shown somewhat schematically in Figs. 1 and 2 a cutting apparatus of the form shown and claimed in copending application, Serial No. 378,102, and comprising a carriage 10, which travels horizontally on rails over a table 12 on which may be supported a templet, drawing, pattern or other guide, and which projects beyond said table. A pair of parallel superposed rails 13 on the carriage 10 supports a drive unit 14 over the table 12, and a plurality of torch crosshead units 15 on the projecting part of said carriage.

The drive unit 14, which may be of any well known type, or which may be of the form shown and claimed in copending application, Serial No. 395,616, has a tracing element 18 in the form of a tracer wheel, pointer, spot of light, or the like, which can be steered along the outline of the pattern or other guide to be copied or traced.

The torch crosshead units 15 travel over a plate 20 or other workpiece on a table 21 to form multiple cuts, and are secured to the drive unit 14 by a bar 22 for movement therewith along the carriage 10. These torch crosshead units 15 may be independently adjustable vertically to adjust the elevation of their respective torches 16 with respect to the work to be cut, and horizontally with respect to the driving unit 14, and to each other, as shown and claimed in said copending application, Serial No. 378,102.

Each of the torches 16 is provided with the usual valve controlled conduits 26 and 27 for delivering pre-heat fuel gas and low pressure oxygen respectively to the torch tip, and a valve controlled conduit 28 for delivering high pressure cutting oxygen to said torch tip. Three rigid pipes 30, 31 and 32, extending side by side along the rear carriage base 34, deliver the three gases respectively from the one end of the carriage 10 to a discharge section substantially midway of the projecting part of the carriage, and are provided at said section with respective pipe fittings 35 for ready connection to respective flexible hose 36, 37 and 38 leading to a manifold unit 40 to be described. At the other inlet end, the pipes 30, 31 and 32 are connected by flexible hose to respective gas supply tanks (not shown).

In the manifold system shown in Figs. 1 to 6, one of the torch crosshead units 15, preferably the middle one, has secured to its upper end a bracket 41 supporting the manifold unit 40. This manifold unit 40 comprises three headers 42, 43 and 44, each having an inlet 45 at one end and a plurality of outlets 46 at the top (three being shown). The number of these outlets 46 corresponds to the maximum number of torches which will be supported on the carriage 10 at any one time.

The inlets 45 of the three headers 42, 43 and 44 are connected to the respective outlet fittings 35 of the three pipes 30, 31 and 32, by the hose 36, 37 and 38, so that the three headers will contain the three respective gases necessary for the operation of the cutting torches. These gases are delivered from these headers 42, 43 and 44 to each of the torch crosshead units 15 by three flexible hose 50, 51 and 52 connected between three outlets 46 of the three headers 42, 43 and 44 and the conduits 26, 27 and 28 respectively for delivery to the torch tip. The hose connections to these manifold outlets 46 are of the type which will permit them to be readily engaged or disengaged, so that any number of torch crosshead units 15 may be quickly added to or removed from the carriage 10. When using less than three torches, the unused manifold outlets 46 are plugged by any suitable means.

Although the main hose 36, 37 and 38 to the manifold unit 40 are shown spread apart for the sake of clarity, in actual practice these are bunched and clamped together into a compact unit, and are slack enough to permit free movement along carriage 10 of the crosshead unit 15 carrying said manifold unit, as shown in Fig. 1. Also each set of hose 50, 51 and 52 leading from the manifold unit 40 to a respective crosshead unit 15 are desirably bunched and clamped together, and are looped to afford the necessary slack to permit adjusting movement of said crosshead unit vertically, and also horizontally along the carriage 10 with respect to the crosshead unit carrying the manifold unit 40, as shown in Fig. 1.

In Fig. 7 is shown another form of manifold system embodying the present invention. In this form, the manifold unit 40 is affixed to the carriage 10 desirably on the base 34 thereof, and has its three inlets 45 connected directly to the outlet ends of the three gas supply pipes 30, 31 and 32. The gas from the manifold unit 40 is piped from the outets 46 of said unit to the respective torches 16 by flexible hose 50a, 51a and 52a.

A valve 55 in the high pressure cutting oxygen line 32 regulates the pressure in said line according to the thickness of the plate to be cut, and is operated from a hand wheel 56 mounted on the carriage 10, and having a suitable drive connection 57 to the operating member of said valve. A suitable gauge 54 mounted on the carriage 10 indicates the pressure in the line 32.

The pressure in the pre-heat gas lines 30 and 31 may be regulated in any suitable manner, as for instance from the supply tanks. These pre-heat gas lines 30 and 31 are provided with respective valves 58 and 59, and the high pressure cutting oxygen line 32 is provided with a similar valve 60. As a feature of the present invention these vaves 58, 59 and 60 are of the quick-acting type, controlled from any one of two remote control stations located on two panels 61 and 62. One of these panels 61 is desirably secured to the intermediate section of the carriage 10, while the other panel 62 is desirably secured to the outer end of the projecting part of said carriage. The panel 61 carries switches 63 and 64 controlling the opening and closing of the two pre-heat gas valves 58 and 59 in unison, and also carries switches 65 and 66 controlling the opening and closing of the high pressure cutting oxygen valve 60. The other panel 62 carries a similar set of switches 67, 68, 69 and 70, the switches 67 and 68 controlling the opening and closing of the two pre-heat gas valves 58 and 59 in unison, while the switches 69 and 70 control the opening and closing of the high pressure cutting oxygen valve 60.

The valves 58, 59 and 60 can be of any suitable solenoid controlled type, such as that shown in Fig. 5 in which a coil 73 surrounding the plunger 74 lifts said plunger off its seat to open the valve when said coil is energized.

The wiring diagram in Fig. 8 shows the desirabe manner in which the pre-heat gas valves 58 and 59 are controlled from the switches 63 and 64 on panel 61, or switches 67 and 68 on panel 62. The various switches and contacts in this diagram are shown in full line position with the valves 58 and 59 closed, so that no pre-heat gases are flowing into the manifold unit 40. To open up the valves 58 and 59 from the panel 61, the switch 63 is moved into dotted position, so that current flows from the main line A to point 80, through said switch in dotted position to points 81 and 82, through relay coil 83 to point 84, through switches 64 and 68 in full line position, and back to line B. The energised relay coil 83 causes closure of contacts 85 and 86 into dotted position shown, so that current flows between points 87 and 82 through parallel branches. One of the branch currents flows from point 87, through switch 63 in dotted position to points 81 and 82. The other branch current flows from point 87, through contact 86 in dotted position to point 82. The closure of the contact 86 into the dotted position shown serves to maintain the relay coil 83 energized, even after switch 63 has been returned into full line position, so that contact 85 will also remain closed in dotted position. As long as contacts 85 is in this closed position, current will flow from main A to point 87, through contact 85 in dotted position to point 88, through the parallel connected solenoid coils of the pre-heat gas valves 58 and 59, and to main B. The energization of these valve coils opens up the two valves 58 and 59 in unison, so that flow of low pressure oxygen and fuel gas is established to the manifold unit 40, and in turn to the torches 16.

The opening of the valves 58 and 59 can also be accomplished by moving the switch 67 on the panel 62 into the dotted position shown. The effect of this closing is similar to that described with reference to the closing of switch 63.

After the switches 63 or 67 have been operated as indicated, the pre-heat gas valves 58 and 59 can be closed only by moving the switches 64 or 68 into the dotted position shown. When these switches 64 and 68 are so operated, the circuit of the relay coil 83 is opened, so that contacts 85 and 86 are restored into open full line position shown to open the circuits of the valve coils and thereby close the valves 58 and 59.

The switches 63, 64, 67 and 68 desirably have their respective blades spring-pressed to normally urge them into full line position. These blades desirably extend substantially horizontally with their outer ends projecting from the panels 61 and 62 for manipulation, or if desired, separate operating levers may be provided for the manipulation of the switches.

In actual operation, all that is necessary to effect the desired opening or closing of the pre-heat gas valves 58 and 59 is to flip the corresponding switch blade or operating lever against the action of the spring. In the case of the switches 63 and 64, the release thereof effects their return into full line position, but the closure of the contact 86 by the previous operation of said switches nevertheless maintains the valves 58 and 59 open until the switches 67 or 68 are operated into dotted position shown. As soon as these latter switches are so operated, the valves 58 and 59 are closed, and will remain so even though these switches have been released and permitted to return to normal position.

The wiring system shown in Fig. 9 for operating a high pressure cutting oxygen valve 60 is similar to that shown in Fig. 8, except that instead of having a pair of solenoid valve coils connected in parallel, there is only one coil for operating the single valve 60. The switches 65, 66, 69 and 70 for controlling the valve 60 are desirably spring-pressed and operated in a manner similar to that described with reference to switches 63, 64, 67 and 68 in diagram Fig. 8.

It should be noted that the electrical systems shown in Figs. 8 and 9 are such as to electrically and automatically close the solenoid operated valves 58, 59 and 60 when there is a disruption of the commercial supply current. Such disruption of the supply current deenergizes the relays 83, so that contacts 85 will be opened. Consequently no current will flow to the solenoids of the valves 58, 59 and 60, and these valves will close. Whenever this condition occurs, it is necessary to actuate the "on" switches 63 and 65 to reopen the valves 58, 59 and 60.

As many changes could be made in the above apparatus, and many apparently widely different embodiments of this invention could be made without departing from the scope of the claims, it is intended that all matter contained in the above description or shown in the accompanying drawings shall be interpreted as illustrative and not in a limiting sense.

What is claimed is:

1. A cutting machine including a carriage supported for horizontal lateral movement, a plurality of torch crossheads independently and detachably supported on said carriage and movable lengthwise of the latter, means normally rigidly connecting said crossheads and permitting independent adjustment of said crossheads in respect to each other, gas supply pipes supported on said carriage, a plurality of manifold headers secured to one of said crossheads, and having their inlets connecting with the discharge ends of said pipes respectively, and disengageable flexible hose for delivering the respective gases from the outlets of said headers to the torches on each of said crossheads.

2. A cutting machine including a carriage supported for lateral movement in one direction, a plurality of separate torch crossheads supported on said carriage for movement therewith, means connecting said crossheads to effect simultaneous movement of the latter along said carriage, said means permitting independent adjustment of said crossheads along the carriage and toward and from each other, three gas supply pipes extending lengthwise of said carriage, three manifold headers secured to one of said crossheads, and having their inlets connecting with the discharge ends of said pipes respectively, means for delivering the three gases from one set of outlets of said headers to the torch on said last-mentioned crosshead, and flexible hose disengageably connected to other outlets of said headers for delivering the three gases to the torches of each of the other crossheads.

3. A cutting machine including a carriage supported for lateral movement, a plurality of separate torch crossheads independently supported on one side of said carriage, means extending lengthwise of said carriage for connecting said crossheads to effect simultaneous movement of said crossheads along said carriage and permitting adjustment of said crossheads toward and from each other, three gas supply pipes secured side by side to said carriage on the side thereof opposite to said crossheads, flexible hose leading from respective sources of gas supply and connected to the respective inlet ends of said pipes, three closely adjoining manifold headers secured to one of said crossheads, three flexible hose between the discharge ends of said pipes and the inlets of said headers respectively, means for delivering the three gases from one set of outlets of said headers to the torch on said last-mentioned crosshead, and flexible hose disengageably connected to other outlets of said headers for delivering the three gases to each of the torches of the other crossheads.

4. A torch cutting machine comprising a carriage, a torch supported on said carriage for movement therewith and therealong, a conduit for delivering a gas to said torch, a valve in said conduit, a pair of spring-pressed electric switches remote from said valve, means responsive to manipulation of one of said switches from a normal position and against the action of its respective spring for opening said valve, said latter switch returning to normal position under the action of its spring after its release, means for maintaining said valve open after the actuation and release of said last-mentioned switch and means responsive to actuation of the other switch from a normal position and against the action of its respective spring for closing said valve.

5. A torch cutting machine comprising a carriage, a torch supported on said carriage for movement therewith and therealong, a conduit for delivering a gas to said torch, a solenoid controlled valve in said conduit, a pair of electric control means mounted at respective spaced stations on said carriage remote from said valve, and means responsive to the operation of said control means at either station to selectively open or close said valve.

6. A torch cutting machine comprising a carriage, a plurality of torches supported on said carriage for movement therewith and therealong, a plurality of conduits for delivering pre-heat gases and high pressure cutting oxygen to said torches, a solenoid controlled valve in each of said conduits, a pair of electric control means mounted at respective spaced stations on said carriage remote from said valves, and means responsive to the operation of said control means at either station for selectively opening or closing said valves.

7. A torch cutting machine comprising a carriage, a torch supported on said carriage for movement therewith and therealong, a plurality of conduits supported on said carriage for delivering pre-heat gases and high pressure cutting oxygen to said torches, a solenoid controlled quick acting valve in each of said conduits, manifold headers carried by said carriage and having their inlets connecting with the discharge ends of said conduits, means for delivering the gases from the outlets of said headers to each of the torches four electric switches at a station on said carriage remote from said valves, four electric switches at another station on said carriage remote from said valves, means responsive to the operation of a switch at either station for opening the pre-heat gas control valves in unison, means responsive to the operation of a second switch at either station for closing said pre-heat gas control valves in unison, means responsive to the operation of a third switch at either station for opening said high pressure cutting oxygen control valve, and means responsive to the operation of the fourth switch at either station to close said last-mentioned valve.

8. A torch cutting machine comprising a carriage, a torch supported on said carriage for movement therewith and therealong, a conduit for delivering a gas to said torch, a solenoid controlled valve in said conduit, an electric switch in the circuit of said solenoid, means responsive to the actuation of said switch for opening said valve, a second electric switch in the circuit of said solenoid, means responsive to the actuation of said second switch for closing said valve, means automatically operable when the current of said circuit is interrupted for closing said valve independently of any actuation of said switches, means for holding said valve in closed position even after restoration of said current in the absence of any reactuation of said first-mentioned switch after interruption of said current, and means for reopening said valve after restoration of said current upon reactuation.

9. A torch cutting machine including a carriage, means supporting said carriage for horizontal movement in one direction, a plurality of separate cutting torches independently supported on said carriage for horizontal movement therewith in said direction, means detachably connecting said torches for effecting simultaneous movement thereof along the carriage at right angles to said first-mentioned direction, said torches being adapted to cut a metal workpiece during said movements to effect duplicate cuts, and being independently adjustable vertically to adjust their elevations with respect to the work to be cut, and horizontally along said carriage with respect to each other, gas supply lines to said carriage, manifold headers carried by said carriage and having their inlets connecting with the discharge end of said lines respectively, and disengageable flexible hose for delivering the gases from the outlets of said headers to each of said torches, said hose permitting said independent adjustments without disengagement of said hose.

10. A torch cutting machine comprising a torch, a carriage supporting said torch, a conduit on said carriage for delivering a gas to said torch, a valve in said conduit, and electrically controlled means for effecting opening or closing of said valve, including a manually actuated control member determining the operation of said valve into open or closed position, means operable automatically upon disruption of the current in said electric means, and independently of the actuation of said control means for effecting closing of said valve, means for holding the valve closed after restoration of said current independently of any actuation of said control means previous to the restoration of said current, and means for reopening said valve after restoration of said current upon actuation of said control means.

11. A torch cutting machine comprising a carriage, a torch supported on said carriage for movement therewith and therealong, electric means on said carriage for operating said valve into open or closed position, including manually actuated control means determining the operation of said valve into open or closed position, means operable automatically upon disruption of the current in said electric means and independently of the actuation of said control means for closing said valve, means for holding said valve closed after restoration of said current in the absence of any manual valve opening actuation of said control means after disruption of said current, and means for reopening said valve after restoration of said current upon actuation of said control means.

12. A torch cutting machine comprising a carriage, a torch supported on said carriage for movement therewith and therealong, a conduit on said carriage for delivering a gas to said torch, a valve in said conduit, a first electric switch, means operable upon actuation of said switch for opening said valve, means for maintaining said valve open independently of any actuation of said switch, a second electric switch, means for closing said valve upon actuation of said second switch, and means for maintaining said valve closed independently of the operation of said second switch.

13. A torch cutting machine including a carriage, a torch supported on said carriage for movement therewith and therealong, a conduit on said carriage for delivering gas to said torch, a solenoid controlled valve in said conduit and on said carriage, and electrically operated means on said carriage for making and breaking the circuit of said solenoid valve, including a switch for said solenoid, a relay for operating said switch, and a pair of switches, one for making the circuit of said relay and the other for breaking it.

14. A torch cutting machine including a carriage, a torch supported on said carriage for movement therewith and therealong, a conduit on said carriage for delivering gas to said torch, a solenoid controlled valve in said conduit and on said carriage, and electrically operated means on said carriage for making and breaking the circuit of said solenoid valve, including means operable upon actuation of said switch for closing said valve, means for closing said valve automatically upon interruption of the current in said circuit, and for maintaining said valve closed after restoration of said current independently of the operation of said switch, a second electric switch, and means for reopening said valve after restoration of the current upon actuation of said second switch.

15. A torch cutting machine including a carriage, a torch supported on said carriage, a conduit for delivering gas to said torch, a solenoid controlled valve in said conduit, and electrically operated means on said carriage for making and breaking the circuit of said solenoid valve, said means including a relay, a pair of switches in series with said relay, one of said switches being normally open and the other normally closed, and a second pair of switches controlled by said relay, one of said second pair being in parallel with said normally open switch and acting to keep the relay energized when momentary contact is made at said normally open switch, and the other of said second pair being in series with said solenoid and in parallel with said relay and said normally open switch, and acting, upon momentary breaking of its contact, to break the circuit of said solenoid valve, whereby said valve is opened and remains open upon momentary closing of said normally open switch and said valve is closed and remains closed upon momentary opening of said normally closed switch.

16. A torch cutting machine including a carriage, a torch supported on said carriage, a conduit for delivering gas to said torch, a solenoid controlled valve in said conduit, and electrically operated means for making and breaking the circuit of said solenoid valve, and thereby permitting or preventing flow of gas to said torch, said means including a relay coil, a pair of normally closed switches in series with each other and with said relay, a pair of normally open switches in parallel with each other and in series with said relay and said first pair, a pair of normally open relay actuated switches, one in series with the solenoid of said valve and the other in series with said relay and said normally closed switches, whereby, upon momentarily closing one of said first mentioned normally open switches, said valve is opened and held open and upon momentarily opening one of said normally closed switches, said valve is closed and held closed.

17. A torch cutting machine including a torch, a gas valve for supplying gas to said torch, a solenoid coil for opening said valve, a relay coil, a normally open switch, a normally closed switch, a pair of normally open switches adopted to close by the energizing of said relay coil, and an electric connection whereby upon momentarily closing said first mentioned switch, current will energize said relay coil by flowing through said normally closed switch, will flow through one of said pair of switches to energize said solenoid coil and open said valve, and will flow through the other of said pair of switches to keep said relay energized, and whereby upon momentarily opening said second mentioned switch, the circuit of said relay is broken and thereupon the circuit of said solenoid is opened.

ALFRED F. CHOUINARD.
LOUIS A. BORDEAUX.